United States Patent [19]

Norkey

[11] Patent Number: 5,161,834
[45] Date of Patent: Nov. 10, 1992

[54] FLUID CONNECTOR WITH CARTRIDGE MEMBER AND RELEASE MECHANISM

[75] Inventor: Phillip J. Norkey, Jackson, Mich.

[73] Assignee: Huron Products, Inc., New Haven, Mich.

[21] Appl. No.: 589,033

[22] Filed: Sep. 27, 1990

[51] Int. Cl.$^5$ .............................. F16L 37/00
[52] U.S. Cl. ................... 285/319; 285/921; 285/317; 285/39
[58] Field of Search ............. 285/317, 319, 81, 307, 285/921, 924

[56] References Cited

U.S. PATENT DOCUMENTS

| | | | |
|---|---|---|---|
| 3,929,355 | 12/1975 | Sljusar | 285/308 X |
| 4,135,745 | 1/1979 | Dehar | 285/924 X |
| 4,351,550 | 9/1982 | Anderson et al. | 285/256 X |
| 4,610,468 | 9/1986 | Wood | 285/921 X |
| 4,630,848 | 12/1986 | Twist et al. | 285/308 |
| 4,681,351 | 7/1987 | Bartholomew | 285/319 |
| 4,691,943 | 9/1987 | DeLand et al. | 285/308 X |
| 4,753,458 | 6/1988 | Case et al. | 285/921 X |
| 4,781,400 | 11/1988 | Cunningham | 285/319 X |
| 4,834,423 | 5/1989 | DeLand | 285/921 X |
| 4,944,536 | 7/1990 | Bartholomew | 285/319 |
| 4,951,975 | 8/1990 | Bartholomew | 285/319 X |
| 4,966,398 | 10/1990 | Peterson | 285/319 X |
| 4,979,765 | 12/1990 | Bartholomew | 285/319 X |

FOREIGN PATENT DOCUMENTS 2503550 1/1975 Fed. Rep. of Germany ...... 285/308

Primary Examiner—Randolph A. Reese
Assistant Examiner—Tim Aberle
Attorney, Agent, or Firm—Kinzer, Plyer, Dorn, McEachran & Jambor

[57] ABSTRACT

A fluid connector system comprising a housing having a fluid port; a cartridge permanently insertable in the fluid port; a conduit detachably insertable in the cartridge; the cartridge comprising a housing insertable in the fluid port and having an opening therethrough communicable with the fluid port, a first O-ring mounted thereon and disposable in sealing engagement with the housing, the cartridge housing being securable within the housing when the cartridge is inserted in the fluid port, a bushing and at least one O-ring disposed in the cartridge opening and disposable in sealing engagement with the conduit, and a retainer disposed in the opening and cooperable with the conduit for detachably securing the conduit in the cartridge in a coupling condition therewith when the conduit is inserted in the opening; and a release member mounted in the cartridge housing and cooperable with the retainer for releasing the conduit to allow it to be removed from the cartridge into an upcoupling condition.

33 Claims, 2 Drawing Sheets

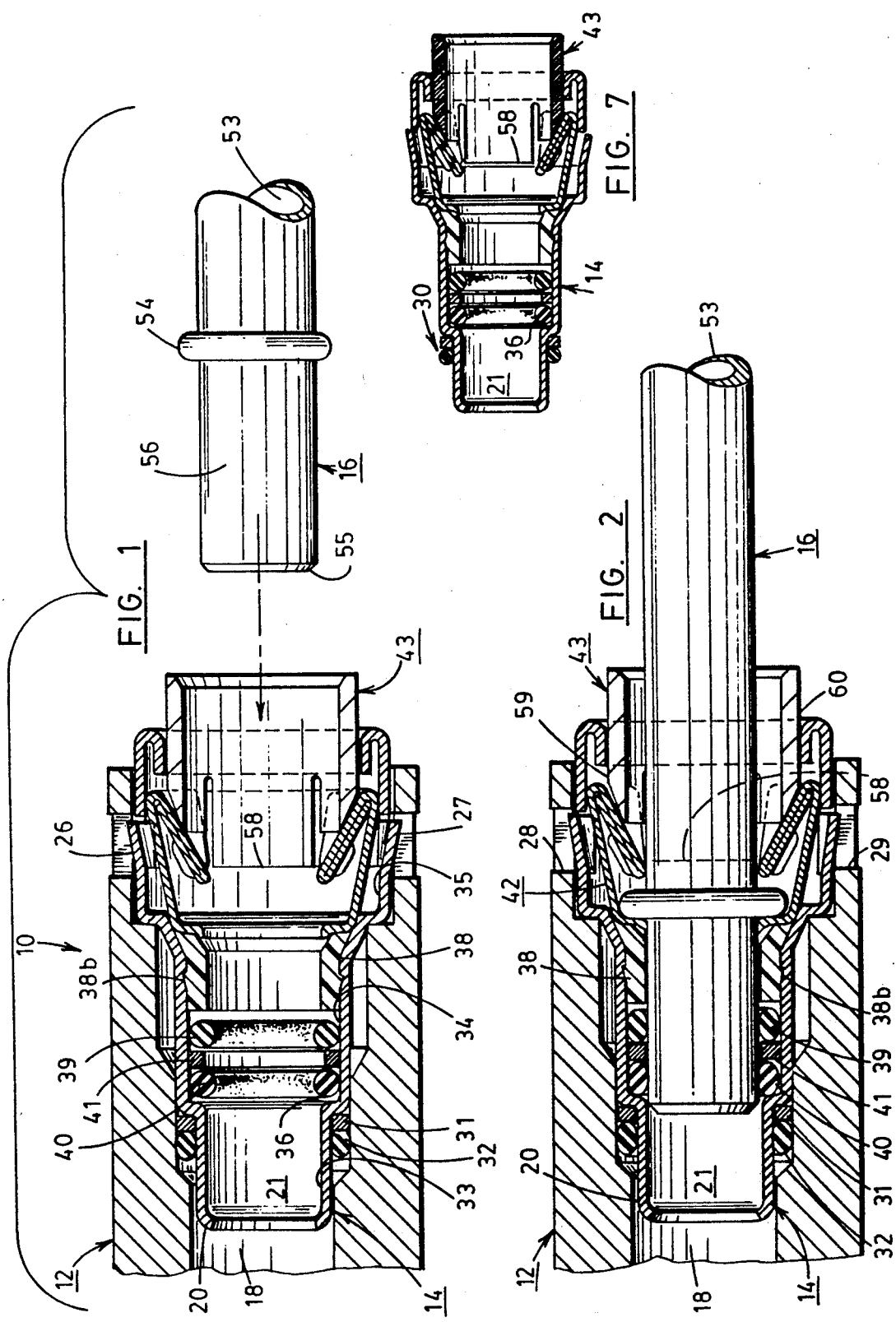

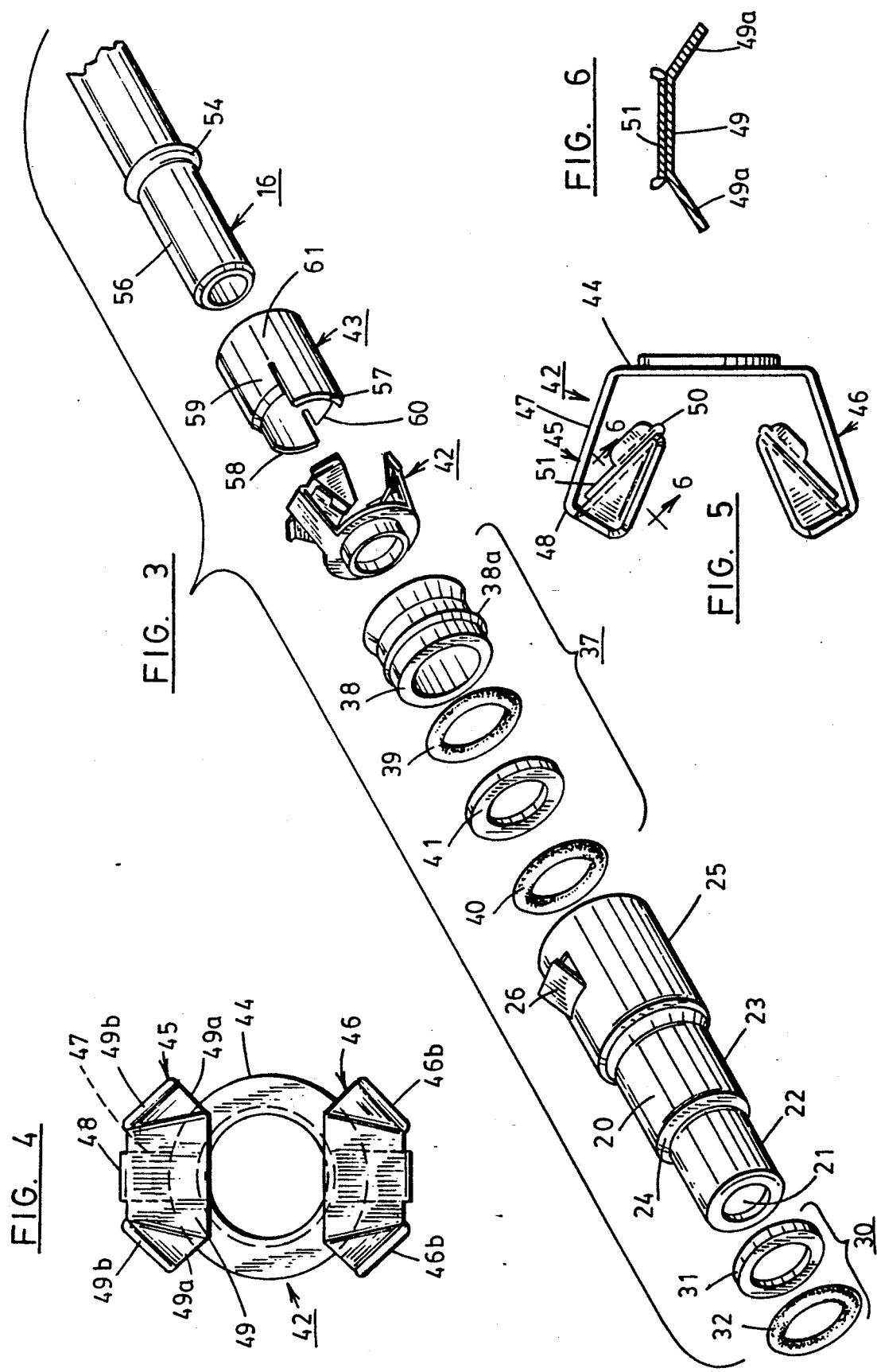

FLUID CONNECTOR WITH CARTRIDGE MEMBER AND RELEASE MECHANISM

This invention relates to fluid connectors and more particularly to fluid connectors that are adapted to be quickly connected and disconnected. The invention further contemplates a fluid connector that is particularly suitable for use in automotive applications such as in fuel lines, air conditioning systems, power steering and brake systems where the female component of the connector is an integral portion of an engine block, transmission housing, an air conditioning block, radiator or fuel rail.

In the prior art, there has been developed a type of quick connector that generally consists of a female member, a male conduit insertable in the female member in coupling relation therewith, sealing means disposed between the female member and the inserted conduit and means disposed in the female member for releasably retaining the conduit in coupling relation with the female member. Examples of such type of connector are illustrated and described in U.S. Pat. Nos. 4,819,908 and 4,846,506.

The male conduit member of such connectors typically is provided with an annular flange which is disposed within the female member when the members are disposed in coupling relation, and the retainer means typically is interposed between the conduit annular flange and a forwardly facing bearing surface on the female member, usually an annular shoulder. When fluid under pressure is applied to the connector in the coupled condition, tending to eject the male conduit member from the female member, the force applied to the male conduit member is transmitted through the conduit annular flange and the retainer engaging the bearing surface on the female member, to the female member.

Fluid connectors of this type typically involve a number of loose components. When conventional connectors are supplied to automotive manufacturers, the components are relatively easy to misplace since the components are generally small in size. Furthermore, shipping the components unassembled may give rise to product liability claims in the event that the components are assembled incorrectly by the automotive manufacturers.

Accordingly, it is the principal object of the present invention to provide an improved fluid connector.

Another object of the present invention is to provide an improved fluid connector that is adapted to be quickly connected and disconnected.

A further object of the present invention is to provide a improved fluid connector adapted to be quickly connected an disconnected which includes a plastic female member insertable into a housing, a metal male member inserted in the female member in coupling relation and a metal retainer disposed within the female member for retaining the male member in coupling relation with the female member.

A still further object of the present invention is to provide an assembled female member which can be shipped as one unit without loose components i.e., pre-assembled.

Another object of the present invention is to provide an assembled female member thereby being preassembled which can be inserted into a housing as a unit.

Other objects and advantages of the present invention will become more apparent to those persons having ordinary skill in the art to which the present invention pertains from the following description taken in conjunction with the accompanying drawings wherein:

FIG. 1 is a cross-sectional view of an embodiment of the present invention;

FIG. 2 is a cross-sectional view of the embodiment shown in FIG. 1 with the male member shown in coupling relation with the female member;

FIG. 3 is a perspective view of the embodiment shown in FIG. 1, illustrating the components thereof in exploded relation;

FIG. 4 is a rear elevational view of the retainer member shown in FIGS. 1 through 3;

FIG. 5 is a side elevational view of the retainer member shown in FIG. 4; and

FIG. 6 is a cross-sectional view taken along line 6-6 in FIG. 5.

FIG. 7 is a sectional view of the assembled female member of the present invention.

Referring to the drawings, there is illustrated a fluid connector system shown generally as 10. The system generally includes a housing 12, a female cartridge member 14, and a male conduit 16. In automotive applications, housing 12 can be an engine block, a transmission housing, an air conditioning block, a radiator, or a fuel rail Housing 12 includes a fluid port 18 connected to a fluid reservoir or a fuel line.

Female cartridge member 14 is permanently insertable in fluid port 18 of housing 12 and includes a cartridge housing 20 having an opening 21 communicable with fluid port 18. As best shown in FIG. 3, cartridge housing 20 includes a reduced end section 22 adapted to be received within housing 12, an intermediate section 23, a surface 24 disposed between reduced end section 22 and intermediate section 23, and an enlarged end section 25. Cartridge member 14 is held in place by means of a pair of extended tab portions 26 and 27 disposed on opposite sides of enlarged end section 25 which engage a pair of openings 28 and 29 of housing 12. When cartridge 14 is inserted longitudinally in housing 12, tabs 26 and 27 are deflected inwardly by the internal surface of housing 12 until the tabs reach openings 28 and 29. At the openings, tabs 26 and 27 spring back to their extended positions, thereby permanently locking cartridge member 14 in housing 12.

Disposed between reduced end section 22 of cartridge 14 and housing 12 is a first sealing means 30. First sealing means 30 includes a spacer 31 disposed adjacent to cartridge housing surface 24 and an O-ring 32 disposed adjacent to the spacer. In a preferred embodiment, O-ring 32 is press-fitted on reduced end section 22 so as to effectively retain spacer 31 and O-ring 32 in place.

Opening 21 of cartridge housing 20 includes a longitudinal passageway 33, first and second enlarged sections 34 and 35, and a transversely disposed bearing surface 36 disposed between first enlarged section 34 and passageway 33. Disposed within first enlarged section 34 is a second sealing mean 37 to provide sealing between conduit 16 and cartridge 14. Second sealing means 37 includes a spacer bushing 38, a pair of O-rings 39 and 40 disposed between bushing 38 and bearing surface 36, and a spacer 41 disposed between the O-rings. In a preferred embodiment, bushing 38 is provided with an annular projection portion 38a which is adapted to be snap-fitted into a complementary annular groove 38b formed in the wall of first enlarged section 34 of the cartridge housing 20 to fix the bushing relative to the cartridge member and cause it to function as an integral component of the cartridge member. Preferably, the bushing and the spacer are formed of nylon. The material of the O-rings would depend on the nature of the system medium. For fuel line applications, materials consisting of a fluorocarbon/ fluorosilicone blend can be used.

Conduit 16 is secured within cartridge member 14 by means of a retainer member 42. Additionally, a release member 43 cooperable with the retainer member is provided to permit the conduit to be disengaged from the cartridge.

FIGS. 4 through 6 best illustrate a preferred embodiment of the retainer member which includes an annular section 44 and a pair of identical leg sections 45 and 46. It should be noted however, that any prior art retainer can be used with this invention. In this preferred embodiment, annular section 44 has an outer diameter sufficient to enable the retainer member to engage the rear end of bushing 38 as shown in FIGS. 1 and 2 and an inner diameter sufficient to permit the conduit member to be received therethrough as shown in FIG. 2. Leg section 45 includes support leg portion 47 extending axially and radially relative to the longitudinal axis of annular section 44 from the annular section and terminating in a first reverse bend 48, a deflectable retaining leg portion 49 extending radially and axially from first reverse bend 48 toward the opening in the annular section and terminating in a second reverse bend 50, and a fold-back portion 51. Retaining leg portion 49 is provided with laterally projecting wing portions 49a which in turn are provided with pad portions 49b formed along the rear edges thereof. Pad portions 49b of leg section 45 and similar pad sections 46b of leg section 46 are circumferentially spaced relative to the longitudinal axis of annular section 44 and are adapted to engage enlarged section 32 when the retainer member is disposed in the cartridge member as shown in FIGS. 1 and 2. Typically, the retainer members are formed by stamping suitably configured blanks from metal sheet materials and bending the blanks to form the leg sections as described. Preferably, and particularly for applications where the fluid with which the connector is used is corrosive, the retainer members are formed of stainless steel.

Conduit 16 is tubular providing a fluid passageway 53. It includes an annular flange portion 54 spaced from a leading end 55 thereof and a leading end portion 56 disposed between the leading end thereof and annular flange portion 54. As best shown in FIG. 5, when leading end portion 56 of the conduit member is fully inserted into the cartridge so that annular flange portion 54 thereof engages annular section 47 of the retainer member, conduit leading end portion 56 will be received within bushing 38, in sealing engagement with O-rings 39 and 40 to provide a fluid tight seal between the conduit and cartridge member.

As the conduit member is inserted into the cartridge member in such manner, the engagement of the annular flange portion 54 of the conduit member will cam the retainer leg portions of the retainer member radially outwardly to permit the annular flange portion to displace past the retaining leg portions of the retainer into engagement with the annular section of the retainer member. Once the annular flange portion advances beyond the retainer leg portions of the retainer member, the retainer leg portions snap back radially inwardly behind the annular flange portion of the conduit member to obstruct the rearward displacement of the conduit member and secure the conduit member in coupling relationship with the housing member as shown in FIG. 2. The conduit member may be formed from any suitable metal or plastic material having sufficient strength characteristics and the annular flange portion of the conduit similarly may be formed by any suitable method.

Release member 43 consists of a short tubular member having a pair of forwardly projecting sections 57 and 58 and upper and lower, beveled cam surfaces 59 and 60. The outside diameter of tubular member 61 is less than the transverse dimension or minor diameter of enlarged section 35 to permit the insertion of the release member into enlarged section 35 of the cartridge, and the inside diameter of tubular member 16 is sufficiently large to permit the passage of the conduit member with annular flange portion 54 therethrough when the release member is mounted in enlarged section 35 of the cartridge member as shown in FIGS. 1 and 2.

As best shown in FIGS. 1 and 2, cam surfaces 59 and 60 are longitudinally aligned with the retaining leg portions of leg sections 45 and 46 of the retainer member so that when the release member inserted in enlarged section 35 of the cartridge member as shown in FIGS. 1 and 2 is displaced forwardly into engagement with the retaining leg portions of the retainer member, the retaining leg portions will be caused to deflect radially outwardly to permit the passage of the annular flange portion of the conduit member past the retaining leg portions of the retainer member and thus permit the removal of the conduit member from the housing member. Excessive deflection of the retaining leg portions is prevented by the engagement of extending sections 57 and 58 with the annular section of the retainer member thus limiting the forward displacement of cam surfaces 59 and 60 in contact with the retaining leg portions.

The female cartridge member 14 of the connector system 10 as described is assembled by first inserting second sealing means 37 mounted on a tool as a single assembly in the enlarged end of the cartridge housing 20 until bushing 38 is snapped into position in annular groove 38b. The retainer member is then positioned in enlarged section 35 so that the annular section thereof engages or is seated on bushing 38. The release member 43 is then inserted into the cartridge member. Finally, first seal means 30 is installed by sliding spacer 31 over reduced end section 22, then press-fitting O-ring 32 in place, whereupon the female member is then fully assembled for installation in housing 12 it is therefore preassembled as illustrated in FIGS. 1 or 7. The female member may be installed in housing 12 simply by inserting the reduced end section 22 into the housing in the conventional manner until tabs 26 and 27 engage openings 28 and 29.

When it is desired to connect the male member to the female member connected to the fluid line under pressure, the conduit member simply is inserted through the release member into enlarged section 35 of the cartridge member so that the annular flange portion thereof engages the retaining leg portions of the retainer member to deflect them radially outwardly and permit the annular flange portion to pass between the retaining leg portions into engagement with the annular section of the retainer member. The male conduit will then be in coupling relation with the cartridge member as shown in FIG. 2. As the conduit is inserted into the cartridge member and the annular flange portion deflects the retaining leg sections to assume the position as shown in FIG. 2, conduit leading end portion 56 will be received within and guided through bushing 38 to place the leading end of the conduit into sealing engagement with the O-rings. The O-rings will thus form a fluid tight seal between the conduit and the cartridge member.

Whenever it is desired to disconnect the connector the release member is displaced forwardly against the housing so that the retaining leg portions will be cammed radially outwardly to permit the conduit member to be withdrawn from the housing member. With the retaining leg portions deflected radially outwardly, the annular flange portion of the conduit member is free to pass unobstructed past the retainer member to be withdrawn from the housing member.

With the connector in the coupled condition as shown in FIG. 2 and fluid pressure being applied, the force of the fluid acts on the conduit member tending to eject it from the cartridge member. The force applied to the conduit member is transferred through the annular flange of the conduit member, the retaining leg portions, the wing portions formed on the retaining leg portions and the tab portions formed on the rear ends of the wing portions to the cartridge member. In this regard, it is to be noted that reverse bend portions 48 of the retainer leg sections are out of longitudinal alignment with any portion of the housing member so that none of the load applied to the retainer member is transmitted from the retainer member to the housing member through either of bend portions 48 which are subject to fatigue failure. All of the load transmitted through the retainer member is transferred to the housing member exclusively through the pad portions of the retainer member and provide greater bearing surfaces for a greater distribution of the load being transmitted.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A fluid connector system comprising:
   a housing having a fluid port;
   a cartridge permanently insertable in said fluid port;
   a conduit detachably insertable in said cartridge;
   said cartridge comprising a housing insertable in said fluid port and having an opening therethrough communicable with said fluid port, first sealing means mounted thereon and disposable in sealing engagement with said housing, means for securing said housing to said cartridge housing when said cartridge is inserted in said fluid port second sealing means disposed in said cartridge opening and disposable in sealing engagement with said conduit, and retaining means disposed in said opening and cooperable with said conduit for detachably securing said conduit in said cartridge in a coupling condition therewith when said conduit is inserted in said opening; and
   means mounted in said cartridge housing separate from and cooperable with said retaining means for releasing said conduit to allow it to be removed from said cartridge into an uncoupling condition;
   said first and second sealing means, said retaining means and said means for releasing said conduit being preassembled with said cartridge housing wherein said cartridge includes at least one transversely disposed bearing surface, said conduit having a leading end portion insertable in said cartridge opening and an annular flange disposed within said cartridge opening and spaced from said cartridge transverse bearing surface when said conduit is inserted in said cartridge, said retaining means including at least one leg section having a transversely deflectable retaining leg portion disposed between said conduit annular flange and said housing.

2. A fluid connector system according to claim 1 wherein said releasing means comprises means for deflecting said retainer leg portion transversely to permit the removal of said conduit from said housing.

3. A fluid connector system according to claim 1 wherein said cartridge housing includes a forward bearing surface and said first sealing means comprises an O-ring press-fitted on said cartridge disposed between said cartridge and said housing and a spacer disposed between said O-ring and said forward bearing surface of said cartridge.

4. A fluid connector system according to claim 1 wherein said cartridge has at least one transversely disposed bearing surface and said second sealing means comprises a bushing mounted within said cartridge opening and adapted to receive said conduit therethrough and at least one O-ring disposed between said bushing and said bearing surface providing a seal between said cartridge and said conduit.

5. A fluid connector system according to claim 4 wherein said cartridge opening is provided with an annular groove and said bushing includes a annular projection portion adapted to snap into said groove.

6. A fluid connector system according to claim 4 wherein said second sealing means further comprises a pair of O-rings disposed between said bushing and said bearing surface and separated by an annular spacer.

7. A fluid connector system according to claim 4 wherein said bushing is engaged by said retaining means to restrict the forward displacement of said retaining means.

8. A fluid connector system according to claim 1 wherein said cartridge is formed of a plastic material.

9. A fluid connector system according to claim 1 wherein said cartridge is formed of a material that is highly heat and chemical resistant.

10. A fluid connector system according to claim 1 wherein said cartridge is formed of polyphenol sulfide.

11. A fluid connector system according to claim 1 wherein said retaining means is formed of stainless steel.

12. A fluid connector suitable for use with a housing having a fluid port comprising;
    a cartridge permanently insertable in said fluid port;
    a conduit detachably insertable in said cartridge;
    said cartridge comprising a housing insertable in said fluid port and having an opening therethrough communicable with said fluid port, first sealing means mounted thereon and disposable in sealing engagement with said housing, means for securing said housing to said cartridge housing when said cartridge is inserted in said fluid port, second sealing means disposed in said cartridge opening and disposable in sealing engagement with said conduit, and retaining means disposed in said opening and cooperable with said conduit for detachably securing said conduit in said cartridge in a coupling condition therewith when said conduit is inserted in said opening; and means mounted in said cartridge housing separate from and cooperable with said retaining means for releasing said conduit to allow it to be removed from said cartridge into an uncoupling condition;

said first and second sealing means, said retaining means and said means for releasing said conduit being preassembled with said cartridge housing, wherein said cartridge includes at least one transversely disposed bearing surface, said conduit having a leading end portion insertable in said cartridge opening and an annular flange disposed within said cartridge opening and spaced from said cartridge transverse bearing surface when said conduit is inserted in said cartridge, said retaining means including at least one leg section having a transversely deflectable retaining leg portion disposed between said conduit annular flange and said housing.

13. A fluid connector according to claim 12 wherein said releasing means comprises means for deflecting said retainer leg portion transversely to permit the removal of said conduit from said housing.

14. A fluid connector according to claim 12 wherein said cartridge housing includes a forward bearing surface and said first sealing means comprises an O-ring press-fitted on said cartridge disposed between said cartridge and said housing and a spacer disposed between said O-ring and said forward bearing surface of said cartridge.

15. A fluid connector according to claim 12 wherein said cartridge has at least one transversely disposed bearing surface and said second sealing means comprises a bushing mounted within said cartridge opening and adapted to receive said conduit therethrough and at least one O-ring disposed between said bushing and said bearing surface providing a seal between said cartridge and said conduit.

16. A fluid connector according to claim 15 wherein said cartridge opening is provided with an annular groove and said bushing includes an annular projection portion adapted to snap into said groove.

17. A fluid connector according to claim 15 wherein said second sealing means further comprises a pair of O-rings disposed between said bushing and said bearing surface and separated by an annular spacer.

18. A fluid connector according to claim 15 wherein said bushing is engaged by said retaining means to restrict the forward displacement of said retaining means.

19. A fluid connector according to claim 1 wherein said cartridge is formed of a plastic material.

20. A fluid connector according to claim 1 wherein said cartridge is formed of a material that is highly heat and chemical resistant.

21. A fluid connector according to claim 1 wherein said cartridge is formed of polyphenol sulfide.

22. A fluid connector according to claim 1 wherein said retaining means is formed of stainless steel.

23. A cartridge for a fluid connector suitable of use with a housing having a fluid port and conduit, said cartridge being permanently insertable in said fluid port and said conduit being detachably insertable in said cartridge, comprising;

a cartridge housing insertable in said fluid port and having an opening therethrough communicable with said fluid port;

first sealing means mounted on said cartridge housing and disposable in sealing engagement with said housing;

means for securing said housing to said cartridge housing when said cartridge is inserted in said fluid port;

second sealing means disposed in said cartridge opening and disposable in sealing engagement with said conduit;

retaining means disposed in said opening and cooperable with said conduit for detachably securing said conduit in said cartridge in a coupling condition therewith when said conduit is inserted in said opening; and means mounted in said cartridge housing separate from and cooperable with retaining means for releasing said conduit to allow it to be removed from said cartridge into an uncoupling condition;

said first and second sealing means, said retaining means and said means for releasing said conduit being preassembled with said cartridge housing wherein said cartridge includes at least one transversely disposed bearing surface, said cartridge opening and an annular flange disposed within said cartridge opening and spaced from said cartridge transverse bearing surface when said conduit is inserted in said cartridge, said retaining means including at lest one leg section having a transversely deflectable retaining leg portion disposed between said conduit annular flange and said housing.

24. A cartridge according to claim 23 wherein said releasing means comprises means for deflecting said retainer leg portion transversely to permit the removal of said conduit from said housing.

25. A cartridge according to claim 23 wherein said cartridge housing includes a forward bearing surface and said first sealing means comprises an O-ring press-fitted on said cartridge disposed between said cartridge and said housing and a spacer disposed between said O-ring and said forward bearing surface of said cartridge.

26. A cartridge according to claim 23 wherein said cartridge has at least one transversely disposed bearing surface and said second sealing means comprises a bushing mounted within said cartridge opening and adapted to receive said conduit therethrough and at least one O-ring disposed between said bushing and said bearing surface providing a seal between said cartridge and said conduit.

27. A cartridge according to claim 26 wherein said cartridge opening is provided with an annular groove and said bushing includes an annular projection portion adapted to snap into said groove.

28. A cartridge according to claim 26 said second sealing means further comprises a pair of O-rings disposed between said bushing and said bearing surface and separated by an annular spacer.

29. A cartridge according to claim 26 wherein said bushing is engaged by said retaining means to restrict the forward displacement of said retaining means.

30. A cartridge according to claim 23 wherein said cartridge is formed of a plastic material.

31. A cartridge according to claim 23 wherein said cartridge is formed of a material that is highly heat and chemical resistant.

32. A cartridge according to claim 23 wherein said cartridge is formed of polyphenol sulfide.

33. A cartridge according to claim 23 wherein said retaining means is formed of stainless steel.

* * * * *